HENRY S. WELLER.
Improvement in Mouse-Traps.

No. 114,629.  Patented May 9, 1871.

United States Patent Office.

HENRY S. WELLER, OF WATERTOWN, CONNECTICUT.

Letters Patent No. 114,629, dated May 9, 1871.

IMPROVEMENT IN MOUSE-TRAPS.

The Schedule referred to in these Letters Patent and making part of the same.

*To all whom it may concern:*

Be it known that I, HENRY S. WELLER, of Watertown, in the county of Litchfield and State of Connecticut, have invented a new and useful Improvement in Mouse-Traps; and I do hereby declare that the following is a full, clear, and exact description thereof, which will enable others skilled in the art to make and use the same, reference being had to the accompanying drawing forming part of this specification.

This invention relates to a new and useful improvement in traps for catching mice and other vermin, and consists in the arrangement of the spring within the case or block of the trap, so that nothing is shown upon the outer surface of the trap, whereby the construction of the "block-spring mouse-trap" is greatly simplified and its utility increased, as will be hereinafter more fully described.

In the accompanying drawing—

Similar letters of reference indicate corresponding parts.

A is the block, which is simply a piece of wood with a large hole, B, bored into it from its bottom, which hole forms the interior cavity of the trap.

C is a hole bored from its side into the hole B, which forms the entrance for the mouse.

D is the spring, which, in this example of my invention, consists of a coil and angular arm, which arm has a sweep from the recoil of the spring horizontal, or on a plane parallel with the bottom of the trap; but I do not confine myself to any particular form or kind of spring, nor to any particular arrangement, so long as it is confined and operates entirely within the trap.

The spring D is confined in a hole bored by the side of B, and the coil is prevented from turning by the projecting lower end, as seen at E.

Figure 1:
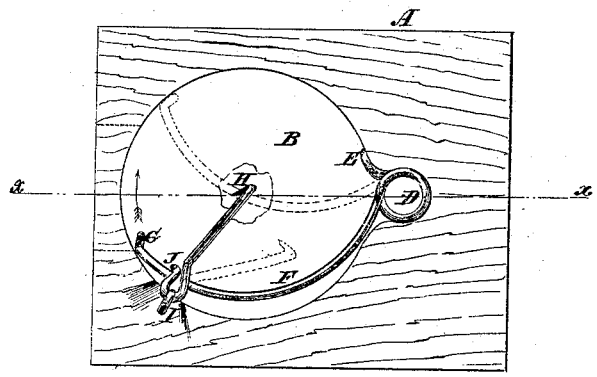
Figure 1 represents a view of the under side of the trap, showing the spring by means of which the mouse is caught and the manner of setting the trap.
Figure 2:
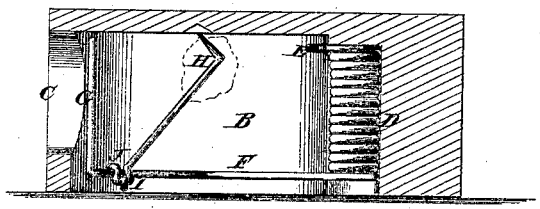
Figure 2 is a vertical section of fig. 1 on the line $x\,x$.

F is the arm, with a portion, G, turned at right angles with F, and it is this portion which sweeps across the entrance hole C and secures the mouse. As seen at fig. 1 the trap is set.

H is the bait-hook. Its other end is secured to the side of the hole B by means of a staple, as seen at I.

The end of the wire after passing through the staple is bent down, as seen at J, so as to form a right angle, or thereabout, by means of which the arm F is held back against the force of the spring to set the trap.

The hook J is very short, so that a slight motion of the bait-hook H will release the arm, when the recoil of the spring will cause the vertical portion G to sweep across the entrance hole, as before stated.

By exposing nothing outside, or concealing all of the operating mechanism within the trap, no suspicion is excited, and the trap is consequently rendered much more effective than the common mouse-trap is found to be; besides, by this mode of construction, the expense is very materially lessened.

Any desired number of traps constructed in this manner may be contained in a single block.

Having thus described my invention,

I claim as new and desire to secure by Letters Patent—

In combination with a block mouse-trap, the spring D, with the arm F G, arranged and operating substantially as shown and described.

HENRY S. WELLER.

Witnesses:
LEMAN W. CUTLER,
MARY L. GOLDSMITH.